United States Patent [19]
Dowe

[11] Patent Number: 5,498,949
[45] Date of Patent: Mar. 12, 1996

[54] RECHARGEABLE DEVICE WITH OPERATIONAL INHIBIT DURING RECHARGING

[75] Inventor: David R. Dowe, Rochester, N.Y.

[73] Assignee: Eastman Kodak Company, Rochester, N.Y.

[21] Appl. No.: 107,397

[22] Filed: Aug. 16, 1993

[51] Int. Cl.⁶ .................................................. H01M 10/46
[52] U.S. Cl. ................................. 320/5; 320/11; 320/54
[58] Field of Search ........................... 320/2, 5, 14, 11, 320/37, 38, 47, 49, 54; 455/89, 90; 354/484, 486

[56] References Cited

U.S. PATENT DOCUMENTS

| | | | |
|---|---|---|---|
| 4,260,230 | 4/1981 | Suzuki | 320/39 X |
| 4,670,701 | 6/1987 | Sako et al. | 320/2 |
| 4,794,315 | 12/1988 | Pederson et al. | 320/2 |
| 4,947,514 | 8/1990 | Gerke, Jr. et al. | 320/2 |
| 5,049,802 | 9/1991 | Mintus et al. | 320/2 |

*Primary Examiner*—Peter S. Wong
*Assistant Examiner*—Edward Tso
*Attorney, Agent, or Firm*—David A. Hall

[57] ABSTRACT

A rechargeable photographic camera includes an interlock circuit that automatically inhibits operation of the camera flash when the camera is mated with a charging cradle, regardless of the condition of a manual on-off flash switch. The rechargeable battery of the camera therefore is assured of receiving a full charging current even if the flash unit is left on when the camera is mated with the charging cradle.

2 Claims, 3 Drawing Sheets

RECHARGEABLE DEVICE WITH OPERATIONAL INHIBIT DURING RECHARGING

BACKGROUND OF THE INVENTION

1. Field of the Invention

This invention relates generally to rechargeable battery-powered devices and, more particularly, to devices that are adapted for direct connection to sources of charging energy.

2. Description of the Related Art

Rechargeable battery-powered devices comprise electrical loads powered by one or more secondary batteries. The secondary batteries can receive electrical energy when the voltage they supply decreases to a level at which the device is inoperable or otherwise does not function properly. The electrical energy recharges the secondary batteries so the voltage they supply returns to normal. Most rechargeable battery-powered devices are designed to mate with a holder or cradle that provides a source of recharging electrical energy. When the device is mated with the charging cradle, electrical connections are automatically made and, when the charging cradle is activated, the secondary batteries contained in the device are recharged. The secondary batteries therefore can be used multiple times without being discarded.

Battery-powered devices include an on-off switch that, when in an on condition, connects the device battery to the device electrical loads. It can be very easy to mistakenly leave a battery-powered device in an on condition when it is being recharged. If the device is mated with the charging cradle while in the on condition, the electrical energy intended for the secondary battery is diverted to electrical loads within the device. For example, many photographic cameras include a flash illumination system having a flash tube and various capacitors that are charged up to operating levels of approximately 330 volts. If a camera is placed in a charging cradle while the camera flash system is on, then much of the electrical energy intended for the secondary battery likely will be consumed by maintaining the electrical charge on the flash capacitors. As a result, the battery will not be recharged and the electrical energy might even be taken from the battery faster than the energy is stored, leaving the battery in a run-down condition. When a user removes the camera from the charging cradle, expecting that the battery will be ready for use, the user may discover that the battery does not have adequate energy to permit camera or flash operation.

It is known to provide a mechanical interlock that prevents current from being provided to the rechargeable battery-powered device if the device is mated with a charging cradle when in the on condition. This prevents the device load from taking the charging current and prevents the secondary battery from becoming run down, but does not provide recharging energy to the battery. For example, see U.S. Pat. No. 4,260,230 to Suzuki. It also is known to mechanically disconnect the device electrical load from the battery during recharging, thereby permitting the battery to be recharged even if the device is left on, but mechanical interlocks can be rather heavy and cumbersome to incorporate and also can be unreliable and relatively expensive. See, for example, U.S. Pat. No. 4,794,315 to Pederson and U.S. Pat. No. 4,947,514 to Gerke. Finally, rather complicated microprocessor-based interlock systems that disconnect the device load from the battery are known, which are even more complicated than mechanical interlocks and suffer from having great cost and complexity. See, for example, U.S. Pat. No. 5,049,802 to Mintus relating to a rechargeable electrical vehicle.

From the discussion above, it should be apparent that there is a need for a rechargeable battery-powered device that includes a relatively simple interlock that prevents the device electrical load from consuming recharge energy intended for the secondary battery when the device is placed in a charging cradle for recharging and the device is left on. The present invention satisfies this need.

SUMMARY OF THE INVENTION

The present invention provides a device having an electrical load supplied with power from a rechargeable secondary battery and adapted to mate with a charger that provides a source of recharging electrical energy to the battery and having a device on-off switch operable between a first on condition in which the device on-off switch connects the electrical load to the secondary battery and a second off condition in which the device on-off switch disconnects the electrical load from the secondary battery, the device further having:

a charger interlock circuit, adapted to connect the rechargeable secondary battery to the source of recharging electrical energy, including an electrical switch operable in a conducting and non-conducting state, wherein the electrical switch is automatically placed in the non-conducting state when the device is mated with the charger irrespective of the setting of the device on-off switch and, when the device is not mated with the charger, the electrical switch is automatically placed in the conducting state only when the device on-off switch is in the on condition.

In this way, electrical loads within the device are prevented from consuming electrical energy when the device is mated with the charger, regardless of the position of the device on-off switch. The secondary battery of the device therefore will receive the electrical recharging energy even if the device on-off switch is mistakenly left in an on condition. This ensures that the battery will be recharged and ready for use.

Other features and advantages of the present invention should be apparent from the following description of the preferred embodiments, which illustrate, by way of example, the principles of the invention.

DESCRIPTION OF THE PREFERRED EMBODIMENTS

Figure 1:
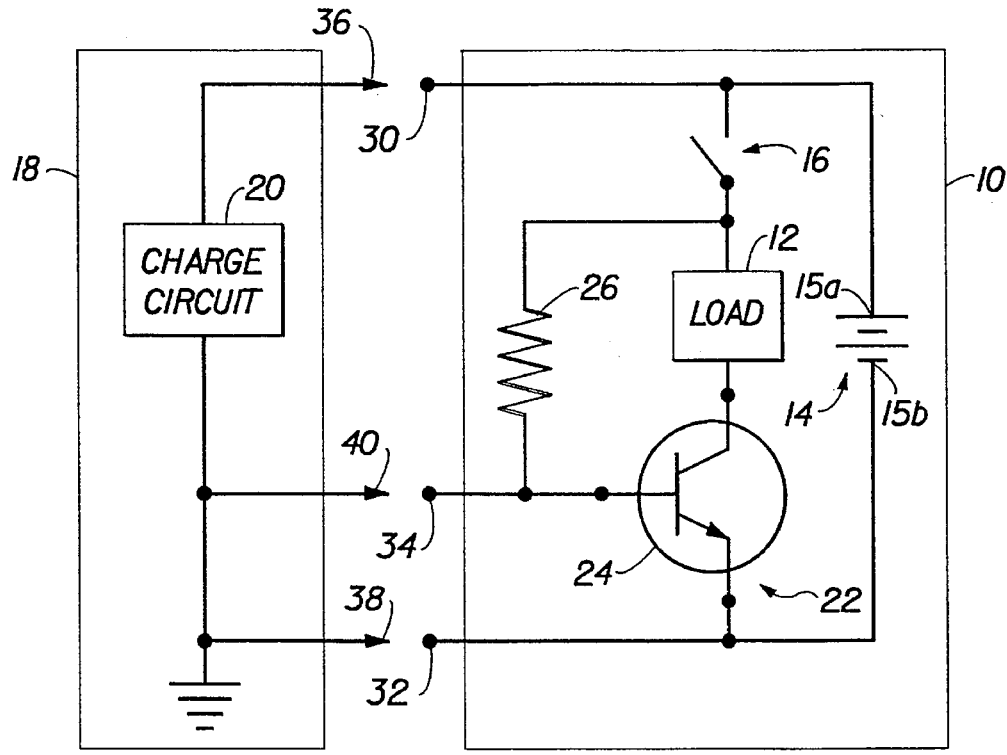
FIG. 1 and FIG. 2 are alternate embodiments of a charger interlock in accordance with the present invention.

A first simplified schematic diagram of a charging device and a source of recharging electrical energy in accordance with the invention are illustrated in FIG. 1. The device 10 includes an electrical load 12 coupled to a rechargeable secondary battery 14, having a positive terminal 15a and a negative terminal 15b, by a device on-off switch 16. The device 10 is adapted to mate with a charging cradle 18 that includes a source of recharging electrical energy in the form of a charge circuit 20. The charge circuit typically is supplied with household electrical current from a standard outlet (not illustrated). The device 10 includes a simple interlock circuit 22 that prevents the load 12 from consuming recharging electrical energy that otherwise would be received by the battery. The interlock circuit includes an electrical switch comprising a transistor 24, connected between the load 12 and the battery 14, and a resistor 26 connected between the on-off switch and load at one resistor end and connected to the transistor base at the other.

Under normal operation with the device 10 separated from the charging cradle 18, the battery 14 is electrically connected to the load 12 when the on-off switch 16 is in the closed, "on" condition. Closing the on-off switch completes a circuit comprising the switch 16, the load 12, the transistor 24, and the battery 14. The transistor is biased by the resistor 26 when the switch is closed such that current flows through the transistor.

The device 10 includes a positive electrical contact 30 that is connected to the positive terminal 15a of the battery 14, a negative electrical contact 32 that is electrically connected with the negative terminal 15b of the battery, and an inhibit contact 34. The electrical contacts 30, 32, 34 of the device 10 mate with corresponding charging cradle electrical contacts 36, 38, 40, respectively, when the device is mated with the charging cradle.

If the device on-off switch 16 is left in the open, "off" condition when the device 10 is mated with the charging cradle 18 for recharging, as is intended for normal operation, then a charging current can flow from the charging cradle positive contact 36 to the device positive contact 30 to the battery 14 and then back to the charge circuit 20 through the device negative contact 32 and charging cradle negative contact 38. If the device on-off switch 16 is left in an "on" condition, that is, if the switch is closed when the device is mated with the charging cradle, then the interlock circuit 22 will automatically disconnect the load 12 from the battery 14. In particular, the transistor 24 will be automatically placed in a non-conducting condition and therefore will ensure that the charging current flows from the device positive contact 30 to the positive terminal of the battery 14 rather than through the closed on-off switch 16 and load 12.

The transistor 24 is automatically placed in a non-conducting condition because, as can be seen in FIG. 1, the base of the transistor is connected to negative ground through the device inhibit contact 34 and the charging cradle inhibit contact 40. Because the transistor base is grounded, the transistor will be automatically placed in a non-conducting state. In this way, the electrical load 12 will not draw charging current regardless of the condition of the device on-off switch 16.

Figure 2:
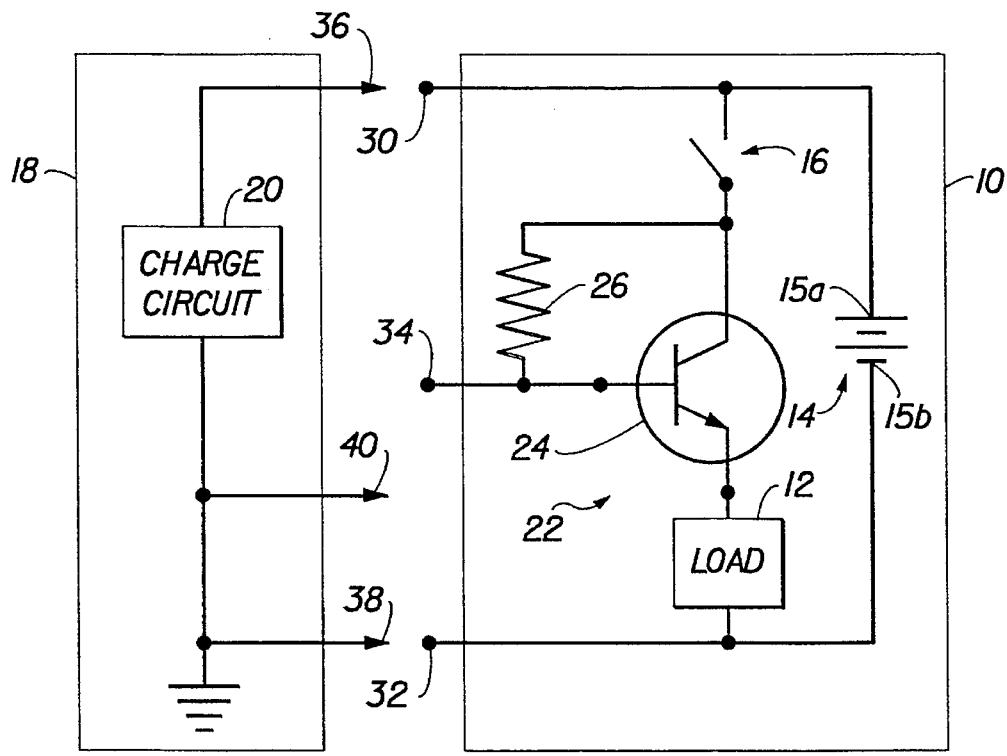

FIG. 2 shows an alternate configuration of the interlock circuit 22 and the electrical load 12 in the device 10. Again, a charging current will flow from the charging cradle positive contact 36 to the device positive contact 30 and through the rechargeable secondary battery 14 regardless of the condition of the device on-off switch 16 because the transistor electrical switch 24 is connected between the load and the rechargeable battery and is in a non-conducting condition by virtue of being a transistor whose base is automatically grounded when the device 10 is mated with the charging cradle 18.

Figure 3:
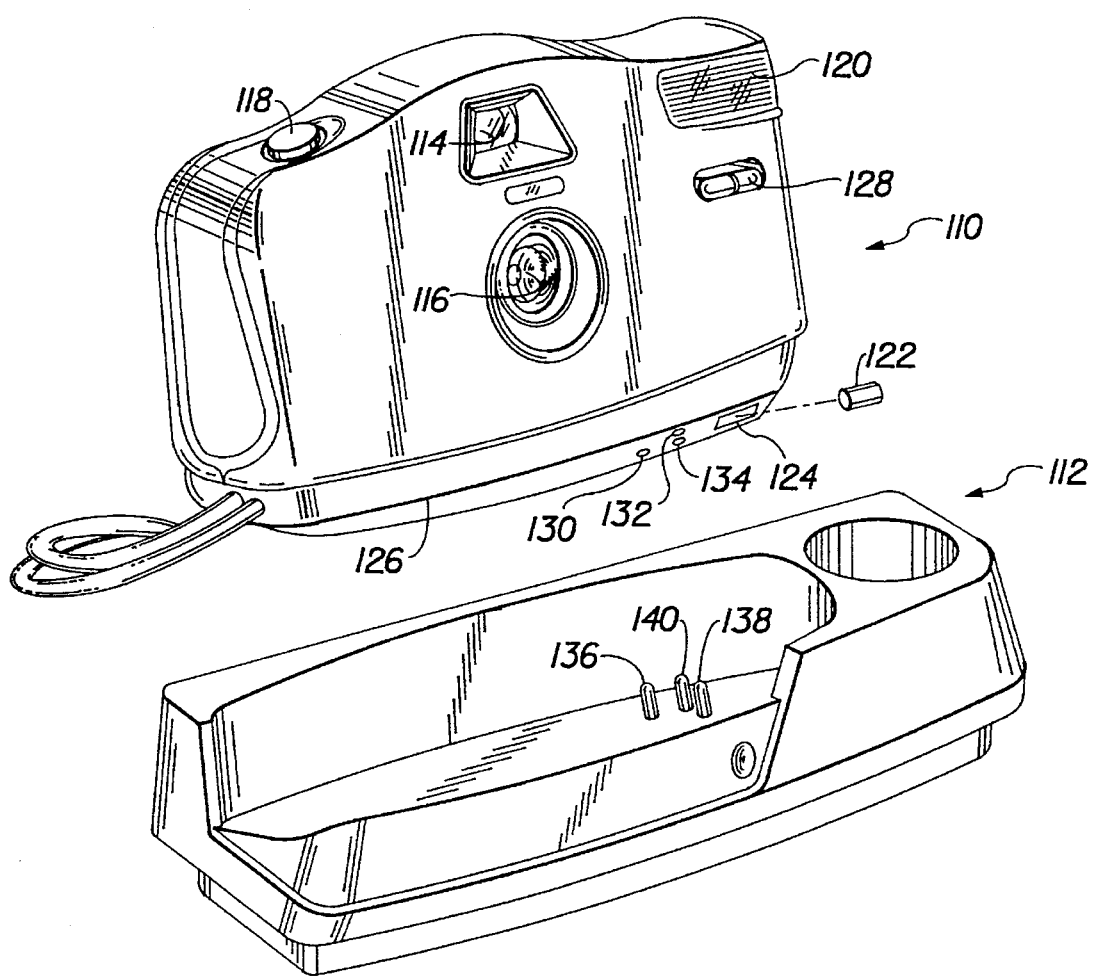
FIG. 3 is a perspective view of a camera and charging cradle constructed in accordance with the present invention.

FIG. 3 shows a rechargeable battery-powered device constructed in accordance with the present invention, the device comprising a rechargeable camera 110 that is adapted to mate with a source of recharging electrical energy comprising a charging cradle 112. A camera user frames a photographic scene through a viewfinder 114 and produces a photographic exposure through an objective lens 116 by pressing a shutter button 118. Auxiliary illumination of the photographic scene is provided by a flash system 120. Electrical power for operating the picture-taking mechanisms of the camera, including the flash system 120, is provided by a secondary battery 122 that is placed within a battery receptacle 124 on the underside 126 of the camera. The operation of the flash system 120 is controlled by a device on-off switch 128 that is operable between an on condition and an off condition to apply and remove power to the flash system. If preferred, the on-off switch also can be made to control other picture-taking camera mechanisms initiated by pressing the shutter button 118, such as film advance and lens focus. When the camera 110 is mated with the charging cradle 112, electrical loads of the camera, such as the flash system 120, are automatically disconnected from the secondary battery 122 regardless of the condition of the device on-off switch 128. In this way, the secondary battery 122 will be recharged, even if the camera user has mistakenly left the device on-off switch in the on condition.

When the camera 110 is mated with the charging cradle 112, three connector sockets 130, 132, and 134 on the underside 126 of the camera mate with three connector pins 136, 138, and 140, respectively, of the charging cradle. As described further below, these electrical pins automatically disconnect the electrical loads of the camera from the secondary battery 122 when they engage the electrical connector sockets. In particular, the connectors 130 and 136 are positive connectors, the connectors 132 and 138 are negative connectors, and the connectors 134 and 140 are inhibit connectors.

Figure 4:
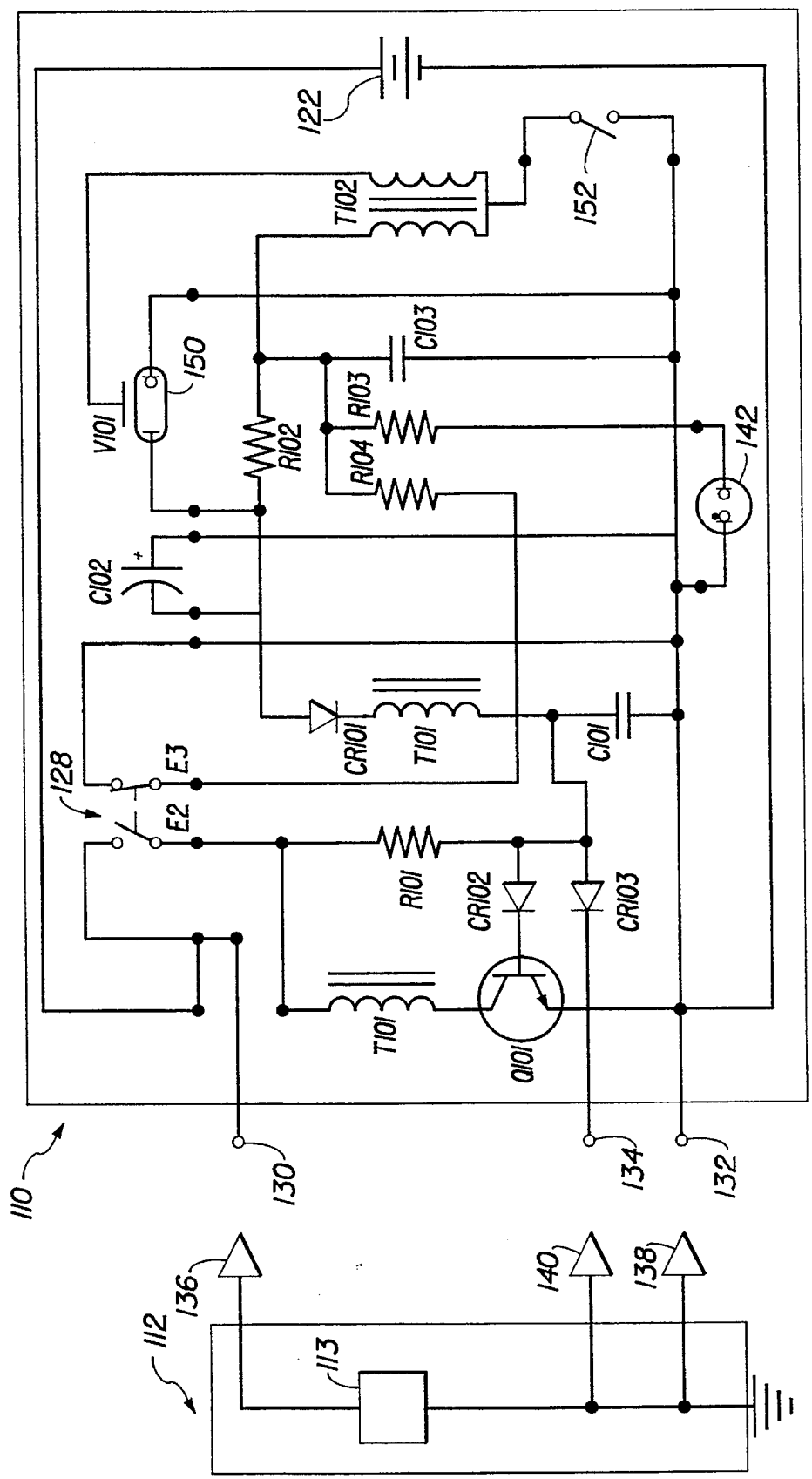
FIG. 4 is a schematic diagram of the charger interlock circuit for the camera and charging cradle illustrated in FIG. 3.

Turning now to FIG. 4, there is illustrated a schematic diagram of the camera 110 and charging cradle 112 illustrated in FIG. 3. The charging cradle includes a source 113 of recharging electrical energy that is supplied with electrical current from a standard household outlet (not illustrated). In normal operation with the camera removed from the charging cradle, if the device on-off switch 128 is in an off condition, then a transistor Q101 cannot receive electrical power from the secondary battery 122 via the on-off switch, a resistor R101, and a diode CR102. As illustrated in FIG. 4, the device on-off switch 128 comprises a first switch E2 and a second switch E3 that operate oppositely. Thus, when the on-off switch is in the off condition, E2 is open and E3 is closed. Therefore, when the device on-off switch 128 is in an off condition, the switch E2 is open, the transistor Q101 is in a non-conducting condition, the switch E3 is closed, and a flash trigger capacitor C103 is shorted to ground through a resistor R104 and the switch E3. Therefore, the flash tube 150 will not have an adequate voltage to produce a flash even if the flash synchronization switch 152 is closed, which ordinarily would trigger a flash.

In normal operation when the camera is removed from the charging cradle and the device on-off switch 128 is closed, the switch E2 is closed while the switch E3 is open and the transistor Q101 oscillates between conducting and non-conducting conditions via operation of a transformer T101 and feedback from a coupling capacitor C101 and the diode CR102. The oscillation, in conjunction with the transformer T101, charges the trigger capacitor C103 up to its operating level of approximately 330 volts. Those skilled in the art will understand how to select the value of the resistor R101 to ensure adequate charging of the trigger capacitor. As the trigger capacitor reaches its operating level, a neon lamp 142 is illuminated to indicate a ready state. Because the switch E2 is closed, the switch E3 is open, and therefore the trigger capacitor C103 is charged so that when the shutter button 118 (FIG. 3) is pressed a synchronization switch 152 is closed and there is a flash from the flash tube 150.

In the recharging mode, when the camera 110 is coupled to the charging cradle 112, if the device on-off switch 128 is off, then the switch E2 is open and the charging current cannot flow from the charging cradle to the camera positive connector socket 130 and to the electrical load comprising the transformer T101. Rather, the current will flow from the positive connecting socket 130 to the secondary battery 122 and back to the camera negative connecting socket 132 and the charging cradle 112. Thus, the battery 122 will be charged. If the device on-off switch 128 is in the on position, then the switch E2 is closed and the flash charger ordinarily would be in an on condition. With the interlock of the present invention, however, even with the on-off switch 128 in the on condition, the transistor Q101 is automatically placed in a non-conducting condition by virtue of its base being connected to ground through the diode CR103 and the inhibit connector socket 134. In this way, the device 110 is automatically rendered inoperative and the battery 122 is supplied with recharging current when the device 110 is mated with the charging cradle 112.

Thus, a device in accordance with the present invention provides a simple and economical electrical interlock such that the device will be automatically inhibited from operating and the secondary battery will be automatically supplied with recharging current regardless of the condition of the device on-off switch. This solution avoids the complications, bulkiness, and unreliability of mechanical interlocks and provides a much simpler implementation than more complicated and expensive microprocessor designs.

The resistance and capacitance values, and the construction of the other circuit elements illustrated, will depend on the particular device application. These details are within the abilities of those skilled in the art and therefore are not more particularly described here.

The present invention has been described above in terms of presently preferred embodiments so that an understanding of the present invention can be conveyed. There are, however, many configurations for charging circuitry not specifically described herein, but with which the present invention is applicable. The present invention should therefore not be seen as limited to the particular embodiments described herein, but rather, it should be understood that the present invention has wide applicability with respect to charging systems generally. All modifications, variations, or equivalent arrangements that are within the scope of the attached claims should therefore be considered to be within the scope of the invention.

The following elements and their corresponding reference numerals are used in the drawings:
device 10
electrical load 12
secondary battery 14
positive terminal 15a
negative terminal 15b
device on-off switch 16
charging cradle 18
charge circuit 20
interlock circuit 22
transistor 24
resistor 26
device positive electrical contact 30
device negative electrical contact 32
device inhibit contact 34
charging cradle positive electrical contact 36
charging cradle negative electrical contact 38
charging cradle inhibit electrical contact 40
camera 110
charging cradle 112
recharging electrical energy source 113
viewfinder 114
objective lens 116
shutter button 118
flash system 120
secondary battery 122
battery receptacle 124
camera underside 126
on-off switch 128
connector socket 130
connector socket 132
connector socket 134
connector pin 136
connector pin 138
connector pin 140
neon lamp 142
flash tube 150
flash synchronization switch 152
coupling capacitor C101
trigger capacitor C103
diode CR102
diode CR103
first switch E2
second switch E3
transistor Q101
resistor R101
resistor R104
transformer T101

I claim:

1. A rechargeable device comprising:

a device electrical load;

a battery circuit that receives electrical energy from a secondary battery of the device;

a power storage circuit that stores electrical energy from the battery circuit and provides it to the device electrical load, the power storage circuit including an energy storage device in which the electrical energy is stored and at least one transistor switching means for providing the electrical energy to the energy storage device;

a recharging connector adapted to mate with a charging device and thereby receive electrical energy from the charging device; and a power switch selectively operable between an "on" position and an "off" position such that the power switch directs electrical energy from the battery circuit to the power storage circuit when the power switch is in the "on" position and directs electrical energy from the recharging connector to the battery circuit when the power switch is in the "off" position; wherein:

the power storage circuit further includes biasing means for placing the transistor switching means into a nonconducting condition in response to the electrical energy received from the battery circuit when the power switch is in the "on" position and the recharging connector is mated with the charging device, thereby placing the power storage circuit in an inoperative condition and preventing the power storage circuit from providing electrical energy to the device electrical load.

2. A rechargeable device as defined in claim 1, wherein the transistor switching means comprises a transistor that includes an emitter and collector that are connected between the device electrical load and the charging device, and the biasing means comprises a diode connecting the transistor base to ground and thereby placing the transistor in a non-conductive condition when the recharging connector is mated with the charging device.

* * * * *